UNITED STATES PATENT OFFICE.

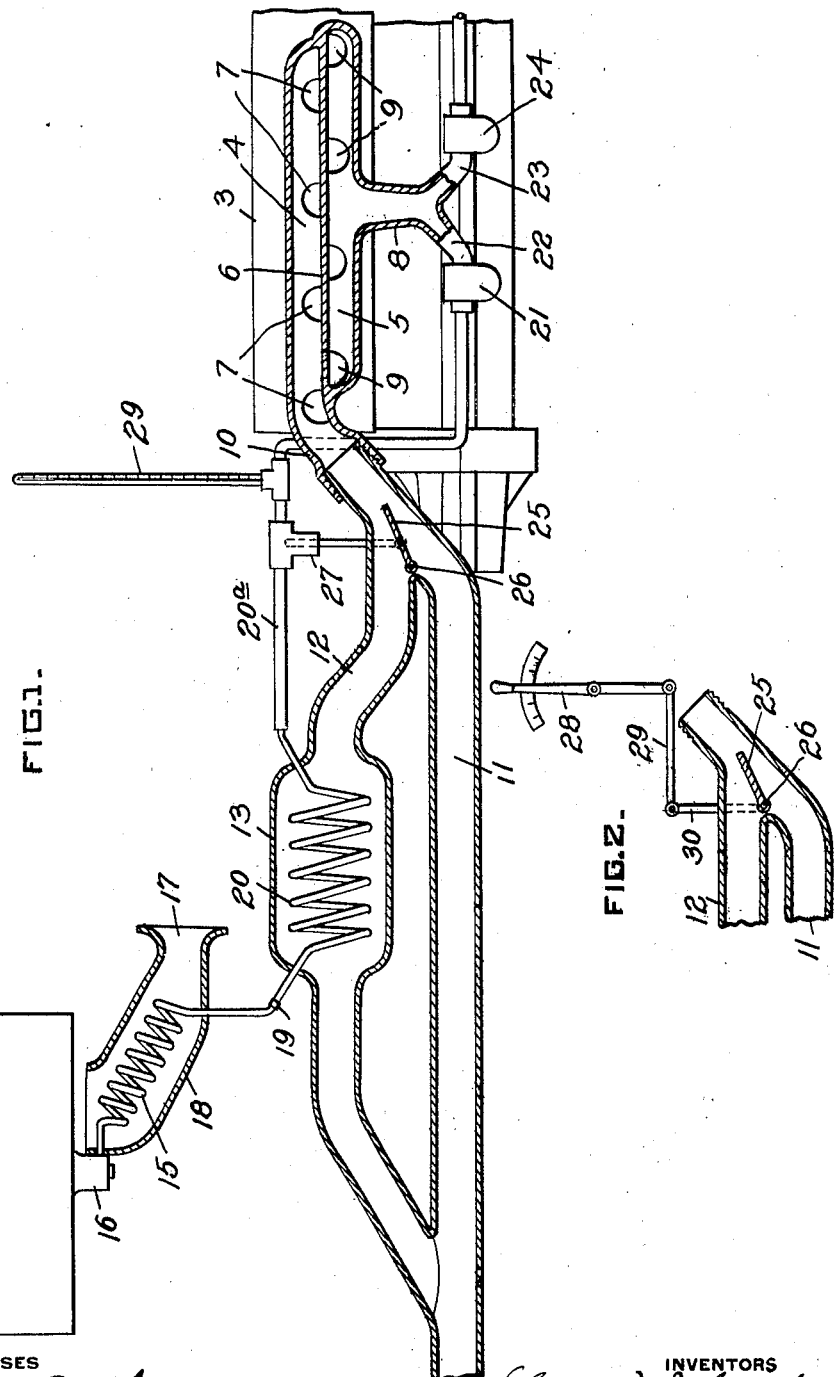

CLARENCE W. JOHNSON, OF BELLEVUE, AND THOMAS G. LAMB, OF BALDWIN TOWNSHIP, ALLEGHENY COUNTY, PENNSYLVANIA.

TEMPERATURE-CONTROLLING DEVICE FOR FUEL.

1,333,546.  Specification of Letters Patent.  Patented Mar. 9, 1920.

Application filed August 24, 1917. Serial No. 187,965.

*To all whom it may concern:*

Be it known that we, CLARENCE W. JOHNSON and THOMAS G. LAMB, citizens of the United States, and residents, respectively, of Bellevue, in the county of Allegheny and State of Pennsylvania, and Baldwin township, in the county of Allegheny and State of Pennsylvania, have made a new and useful Invention in Temperature-Controlling Devices for Fuel, of which the following is a specification.

This invention relates to charge forming devices for use with relatively heavy not readily inflammable liquid fuels such as kerosene, although certain features are valuable where fuels like gasolene are used.

Numerous schemes have been tried for vaporizing the not readily inflammable liquid fuels such as kerosene in order to form proper charges of the vapors thereof and air for use in internal combustion engines and some success has been met with in engines running at constant load. So far as we are aware no devices have yet been successful where the engine load is variable such as the load on an engine used for motor vehicles, tractors, aeroplanes and the like.

An object of this invention is to provide simple means for forming combustible charges of the vapors or mist of not readily inflammable liquid fuels and air; means which may be used in connection with internal combustion engines subject to varying loads; means which will cause the engine utilizing the same to be flexible as regard speed and torque characteristics.

Certain features of this invention are applicable for use in connection with internal combustion engines using the so called commercial gasolenes.

We attain the objects of this invention by means of the device or system diagrammatically illustrated in the drawings in which Figure 1 is a diagram or schematic illustration of the complete system and Fig. 2 is a detail view of a modification of a portion thereof.

An internal combustion engine preferably an automobile engine represented by 3 is provided with a duplex exhaust and inlet manifold made up of an exhaust portion 4 separated from the inlet portion 5 by means of a partition plate 6, the exhaust gases passing from exhaust ports 7 in contact with plate 6 heat the combustible mixture flowing through manifold inlet 8 to inlet ports 9 of the engine. The outlet 10 of the exhaust manifold connects with a branched exhaust pipe, branch 11 of which passes back under the automobile to a suitable muffler (not shown) while branch 12 after being enlarged to form a heating chamber 13 connects with branch 11 so that the exhaust gases passing through branch 12 and the heating chamber 13 will also pass through the muffler. A liquid fuel reservoir 14 located at some suitable point so that the fuel therein may feed preferably by gravity to the engine carbureter has a coil of pipe 15 connected to its outlet 16 and an air scoop 17 is arranged to deflect cold air to said coil 15 for the purpose of keeping the same cool. A hood 18 surrounds coil 15 and connects with scoop 17 the same being arranged so that the air taken in through scoop 17 passes around and over the coil and is discharged upwardly against the bottom of tank 14.

The outlet end of coil 15 connects with one end 19 of a coil of pipe 20 within heater chamber 13. The other end of the pipe of coil 20 passes out through heater chamber 13 and leads to carbureter 21. The tubing between the heater coil and carbureter 21 is preferably of greater diameter than the tubing of the coils.

Inlet 8 of the inlet manifold is provided with two branches forming inlets 22 and 23; 22 to which carbureter 21 is connected and 23 to which a carbureter 24 is connected. Carbureter 21 is adapted to form combustible charges of air and liquid fuel derived from tank 14, while carbureter 24 is adapted to form combustible charges of air and gasolene derived from any suitable tank (not shown). Carbureter 24 it will be understood is used for starting, and, when carbureter 21 is in operation will be completely closed off. When carbureter 24 is in operation it will be understood that carbureter 21 is completely closed off. Suitable means will be provided for simultaneously closing one carbureter off and throwing the other into operation and vice-versa.

A valve 25 pivotally mounted on a pin 26 at the junction of branches 11 and 12 of the exhaust line controls and proportions the passage of exhaust gases from the engine through these lines. A thermostatic device 27 subjected to the heated liquid fuel passing through line 20ª is operatively connected to valve 25 so as to control the position of said valve in accordance with the temperature of the fluid in line 20ª.

A thermometer 29 of any suitable form is connected into line 20ª so as to visibly indicate the temperature of the liquid fuel passing through said line.

In Fig. 2 we have shown a device comprising a pivoted lever 28 and links 29 and 30 for manually operating valve 25.

The air taken in through carbureters 21 and 24 may if desired be heated by any suitable design of stove as is now common but we have found that under ordinary circumstances this is not necessary as the air under the hood of most automobiles is sufficiently hot for use with the heated liquid fuel.

Line 20ª it will be understood must be thoroughly covered with heat insulating material so that the heat imparted to the fuel by the exhaust gases passing in contact with coil 20 will not be dissipated between coil 20 and the engine inlet manifold.

The charges formed of the heated fuel and air taken in through carbureter 21 are raised in temperature in the inlet manifold by contacting with hot plate 6.

The device for cooling coil 15 located between coil 20 and the fuel tank 14 is necessary only where coil 20 is located in close proximity to the fuel tank; the device serves to prevent heated fuel in coil 20 from backing up in the tank. It has been found that it is desirable to maintain the liquid fuel in coil 20 at about 350° Fahrenheit so that the fuel when it reaches carbureter 21 will have a temperature of about 300° Fahrenheit. It has been found that the exhaust gases from the engine are more than sufficient to maintain this temperature and a thermostatically controlled valve 25 is therefore provided for proportioning the amount of exhaust gases passing through the heater 13 in accordance with the temperature of the liquid fuel therein or more properly in line 20ª between the coil and carbureter 21.

The modification shown in Fig. 2 of course can be used for controlling valve 25 in accordance with the temperature indicated by thermometer 27 but it is preferable to control and operate the valve by means of the thermostatic device.

It will be understood that the heater 13 may be made in any desired manner and any suitable type of valve may be substituted for the valve 25.

In some cases it may be found that it is not necessary to have a combined inlet and exhaust manifold but that an ordinary manifold will serve the purpose.

Having thus described our invention what we claim is—

1. In combination with an internal combustion engine, a liquid fuel tank, cooling means for said liquid, a branched exhaust passage, a valve controlling the inlets to said branches, a liquid fuel line passing through one of said branches connected to said fuel tank, and a thermostatic device connected to said valve and operated by the changes in temperature of the liquid fuel after being heated by the exhaust gases.

2. In combination with an internal combustion engine, a liquid fuel tank, an airscoop for cooling the liquid in said tank, a branched exhaust passage, a valve controlling the inlets of said branches, a liquid fuel coil located in one of said branches connected to said fuel tank, and means for operating said valve.

3. In combination with an internal combustion engine, a branched exhaust passage, one of which is enlarged into a chamber, a source of supply of liquid fuel, a second chamber, means for directing air into said chamber, a fuel heater within said first chamber, connections between said source of supply and said heater, and connections between said heater and the engine carbureter, and a thermostatic device subjected to the temperature of the oil between said heater and the engine carbureter and operatively connected to said valve.

4. In combination with an internal combustion engine, a liquid fuel tank, a heating coil receiving fuel from said tank, a cooling coil between said heating coil and said tank through which the fuel for said heater passes from said tank, a casing surrounding said heater, and means for passing all or a portion of the exhaust gases from said engine through said casing.

5. In combination with an internal combustion engine, a liquid fuel tank, a heating coil for liquid derived from said tank, means for conducting liquid from said tank to said heater, means for cooling said means, means for passing regulable quantities of exhaust gases from said engine around said heating coil, and means for visibly indicating the temperature of liquid leaving said coil at a point between said coil and said engine.

6. In combination with an internal combustion engine, a tank for liquid fuel, a heating coil, means for passing fuel from said tank to said coil, means for cooling the liquid passing through said means, a casing surrounding said coil, a pipe for conducting exhaust gases from said engine to said casing, and thermostatically controlled means for regulating the amount of exhaust gases passing through said casing.

7. In combination with an internal combustion engine, a tank for liquid fuel, means for keeping said fuel cool, a heating coil for fuel received from said tank, a branched exhaust pipe connecting with the exhaust of said engine, a casing surrounding said heating coil and connected to one of said branches, a valve for controlling the inlets to said branches and thereby the amount of exhaust gases passing to said casing, and means the operation of which is dependent upon the temperature of the fuel between said heater and the engine for controlling the operation of said valve.

8. In combination with an internal combustion engine, a tank for liquid fuel, a heating coil, means for conducting the liquid from said tank to said heating coil, a second coil interposed between said fuel tank and heating coil, a hood surrounding said second coil, means for directing air into said hood, means for passing regulable quantities of exhausted gases from said engine around said heating coil, and thermostatically-controlled means for regulating the amount of exhausted gases passing around said heating coil.

In testimony whereof, we have hereunto subscribed our names this 21st day of August, 1917.

CLARENCE W. JOHNSON.
THOMAS G. LAMB.

Witnesses:
 EMMA LEA MONTGOMERY,
 E. B. MOLTER.